Jan. 17, 1961     L. KAUFOLD ET AL     2,968,735
FAN SCANNER CELESTIAL DETECTOR SYSTEM

Filed Aug. 17, 1953     4 Sheets-Sheet 1

INVENTORS:
LEROY KAUFOLD
CLYDE H. GETZ
By Herbert E. Metcalf
Their Patent Attorney Jan. 17, 1961 L. KAUFOLD ET AL 2,968,735
FAN SCANNER CELESTIAL DETECTOR SYSTEM
Filed Aug. 17, 1953 4 Sheets-Sheet 2

INVENTORS:
LEROY KAUFOLD
CLYDE H. GETZ
Their Patent Attorneys

Jan. 17, 1961  L. KAUFOLD ET AL  2,968,735
FAN SCANNER CELESTIAL DETECTOR SYSTEM
Filed Aug. 17, 1953  4 Sheets-Sheet 3

INVENTORS:
LEROY KAUFOLD
CLYDE H. GETZ

Their Patent Attorney

United States Patent Office 2,968,735
Patented Jan. 17, 1961

2,968,735
FAN SCANNER CELESTIAL DETECTOR SYSTEM

Leroy Kaufold, Santa Barbara, and Clyde H. Getz, Torrance, Calif., assignors to Northrop Corporation, a corporation of California Filed Aug. 17, 1953, Ser. No. 374,706

13 Claims. (Cl. 250—203)

This invention relates to a light-sensitive detecting system and, more particularly, to a fan-scanner type celestial detector circuit capable of eliminating spurious signals arising in a light-detecting system and capable of selecting, phasing and providing usable control signals from a predetermined light source—a star, for example. Two such detecting systems used simultaneously are capable of automatically tracking a star in such a manner that a usable intelligence can be derived, consistent of the measured or tracked star deviation with respect to some known reference plane established by the tracking means.

The measured or tracked star azimuth is indicated by the relation of the line of bearing of the star in the reference plane with respect to some known reference such as the direction of magnetic north, for example; this intelligence can be used to establish a relationship in space between the tracking means and the selected star as a part of essential information required to perform automatic celestial navigation or can be used in any other manner where an instant means of continual reference to a light source is required.

In the utilization of photoemissive cells in electronic circuits, shot noise is especially noticeable; this factor can be expressed in terms of an effective input resistance at a given temperature and an emission current. It is to be noted that shot noise can occur even when a phototube is being energized from light of relatively uniform intensity; shot noise is thus an inherent fault of the phototube itself. Of course, shot noise is not the sole contributor to photocell signal distortion. Various "background noises" also affect photocell output—sky gradient, for example. Sky gradient becomes especially important in photo-sensing of stars. Thus sky gradient is the main source of noise which the invention herein disclosed is designed to contend with.

Optimum detection of selected light signals is best accomplished by elimination of these undesirable noises—especially in aerial navigation applications where accurate, usable control signals are a prerequisite for operational success.

It is, accordingly, an object of this invention to provide for the eliminataion of undesirable signals in the output from a photo-sensing device.

It is another object of this invention to select and phase intelligence from a photosensing device so as to provide useful control signals.

Among other objects of this invention are the following:

To sense the presence (or absence) of a specific light source—a star, for example.

To provide automatic gain control for signals resulting from light intensity of a given source.

To provide proper orientation of an optical sensing device—a telescope, for example, with a light source—a star, for example.

In a preferred embodiment of the invention disclosed herein, a telescope is used in conjunction with a fan-type scanner, the output of which is sensed by a photo-sensing device. Output from the photo-sensing device is conveyed to a selective filter and from thence to an automatic gain control amplifier and a desired frequency detector; then a parallel path is followed through two identical circuits each comprising a desired frequency demodulator, an integrating circuit and a frequency selective modulator and finally an output too actuating mechanisms. A control circuit, for example, is connected between the photo-sensing device and the selective filter and also to an automatic gain control rectifier, and an adder which are connected, in parallel, with the two identical circuits.

In an alternate embodiment of the invention, a desired frequency filter is connected between the photo-sensing device and the detector circuits; thus the dynamic range of the photo-sensing device is increased.

The operation of the invention is such that the telescope is maintained directed at a desired light source and spurious signals are filtered out of the photo-sensing device output, thereby effecting control signals of optimum form.

The foregoing objects and features will be more fully understood and other objects will be made apparent by reference to the following detailed description viewed in conjunction with the accompanying drawings wherein.

Figure 1:
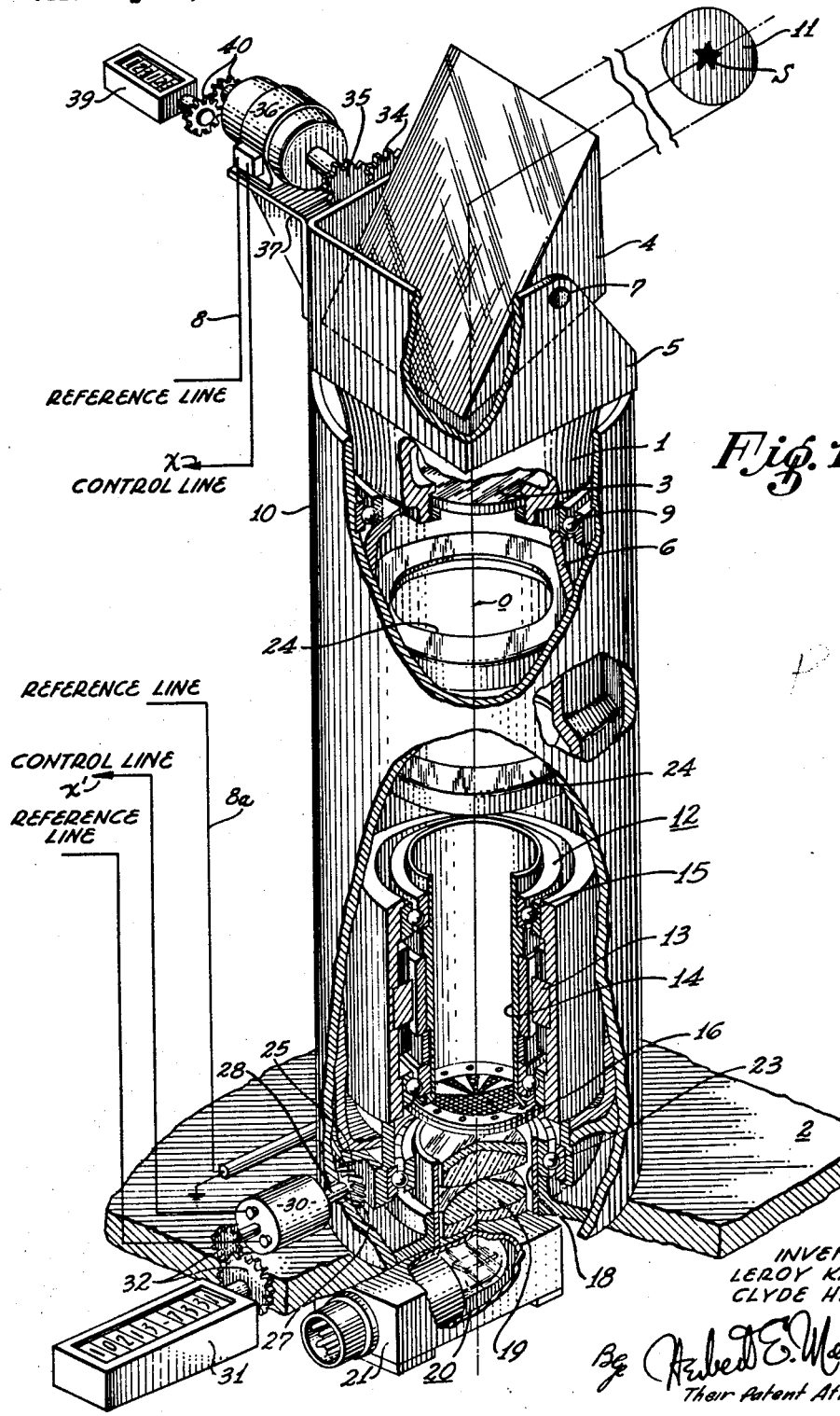
Figure 1 is a perspective view of an optical structure utilizing the invention herein disclosed.

Figure 1 illustrates a telescope 1, preferably positioned with its optic axis O fixed normal to a gyrostabilized platform 2. Telescope 1 includes aplanatic objective lens 3 which is positioned to intercept light from source S—a star, for example, and its surrounding field 11 by means of a total reflecting prism 4, a face of which is directed, at light source S. Prism 4 includes four 35° angles and is mirrored on its face of greatest area. A suitable bracket 5, rigidly secured on the top of telescope barrel 6, supports prism 4 on a horizontal axis by means of trunnions 7; consequently prism 4 can be rotated in order to track light source S.

Telescope barrel 6 is supported near its upper end on bearing 9 which holds telescope 1 in a vertical position in cylindrical housing 10 which is integral with and positioned normal to gyrostabilized platform 2.

Concentrically positioned within the lower portion of telescope barrel 6 is a scanner motor 12 comprised of stator 13 affixed to the inner wall of telescope barrel 6 and of a hollow shaft 14 rotating in bearings 15. Hollow shaft 14 permits passage of light from telescope field 11 and at the same time helps shield the plane of telescope 1 from random light by acting as an effective baffle. Rigidly attached to the lower end of hollow shaft 14 is a scanner disc 16 which lies in the focal plane of telescope 1. The surface of scanner disc 16 includes alternate opaque and light transmissive sectors in accordance with a predetermined configuration for the production of certain desired frequencies. A fundamental frequency of 480 c.p.s. and its accompanying sidebands of 420 and 540 cycles, for example, is produced when a particular scanner configuration is driven at 60 revolutions per second. Scanner disc 16 modulates the incident light into pulses having a repetition rate equal to the rotation of synchronously driven scanner motor 12 which is energized by a voltage of a desired reference frequency in lead 8a. Concentrically positioned with the cylindrical housing 10 and rigidly secured between gyro-stabilized platform 2 is a cylindrical bracket 18 which holds on its reduced diameter upper end a set of achromatic collimating lenses 19 which receive a modulated light signal from scanner disc 16 and direct the signal onto the cathode of photo cell 20 which is mounted directly below lens 19 on photo cell bracket 21 attached below platform 2. The lower end of telescope barrel 6 seats bearing 23 by means of which the barrel 6 is mounted onto cylindrical bracket 18.

Baffles 24 are arranged within telescope barrel 6 in such a manner as to shield the focal plane of the telescope from most of the random light from sources other than field of view 11.

Bevel gear 25 is attached near the lower end of telescope barrel 6 and encircles the outer periphery thereof. Gear 25 meshes with a drive gear 27 mounted on shaft 28 extending through the wall of cylindrical housing 10 and driven by an azimuth motor 30.

An azimuth counter 31 is attached to the shaft of azimuth motor 30 via reduction gearing 32. Azimuth counter 31 gives a continuous indication of the measured or tracked star azimuth as indicated by the relation of the line of bearing of the star in the plane of the gyro-stabilized platform 2 with respect to some known reference, e.g. the direction of magnetic north.

Prism trunnion 7 includes a step down gear 34 attached to its outer end and meshed with a drive gear 35 driven by an elevation motor 36, supported by platform 37 secured to prism bracket 5.

Elevation motor 36, driven by means of reference line 8 and control line $x$, includes counter 39 which continuously indicates the measured or tracked star elevation with respect to gyrostabilized platform 2; counter 39 is driven via reduction gears 40.

Figure 2:
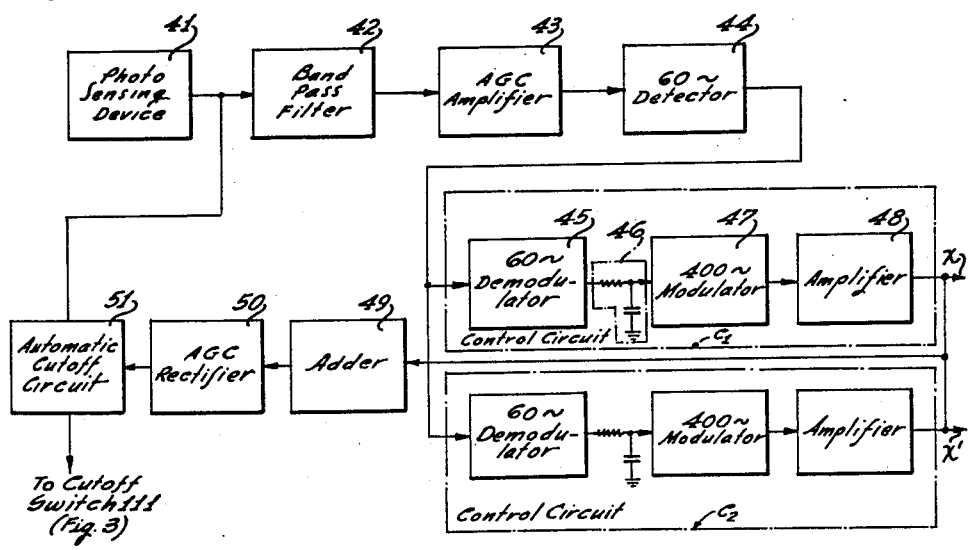
Figure 2 is a block diagram of the invention used in combination with the optical structure of Figure 1.

Figure 2 is a block diagram of the invention—a fan scanner celestial detector system used to control instrumentation previously described in conjunction with Figure 1. The basic purpose of this circuit is to correctly process information received from source S by photo-sensing device 20. Quantitative information is conveyed to this circuit via photo-sensing device 20 by means of phase modulation; this modulation arises from the image location of source S, i.e. when the image falls on optic axis O of scanner disc 16, photo-sensing device 20 will receive a relatively constant energy spectrum and its output will be unmodulated; however, when the image falls on a location other than optic axis O of scanner disc 16 but within range of photo-sensing device 20, the output from this photo-sensing device will be modulated because the various opaque sections of scanner disc 16 will mask the image at various degrees of rotation. The phase of this modulated signal will vary in accordance with location of the image of source S.

It is to be noted that various spurious signals are also conveyed to photo-sensing device 20; such spurious signals include background light, whether gradient or uniform, and light effects due to mechanical and optical misalignments, reflections, etc. Other effects, such as optical aberrations can be nullified by proper selection of lenses, photocell characteristics, etc. In general, however, spurious signals are characterized by a frequency identical to that of the rotation of scanner disc 16 because one cycle of such signals corresponds to one revolution of this disc. The desired image of source S is exposed only as scanner disc 16 permits and will consequently be characterized by a wave form of higher frequency with a repetition rate equal to the rotational speed of scanner disc 16.

Figure 5A:
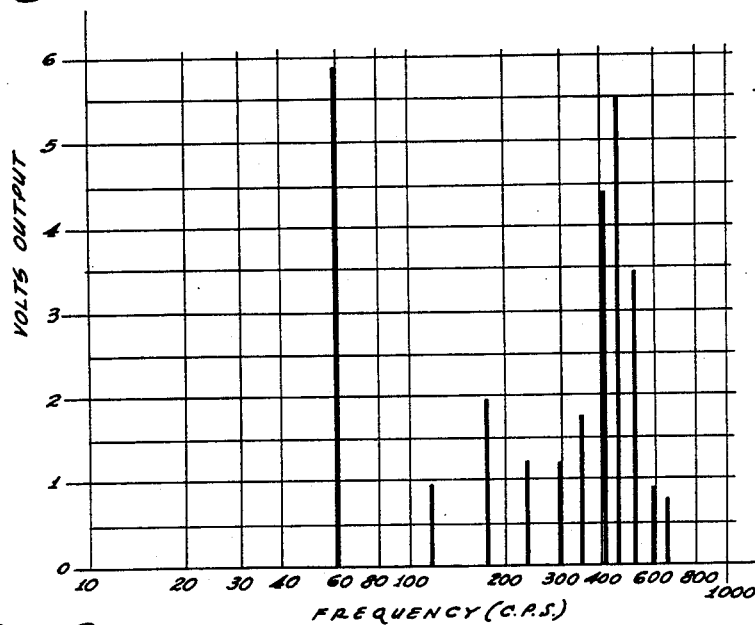
Figure 5a is a graph illustrating the frequency spectrum of the preferred scanner disc shown in Figure 5.
Figure 5:
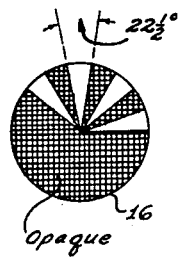
Figure 5 is a drawing showing the configuration of a scanner disc used in a preferred embodiment of the invention.

In a preferred embodiment of the invention as herein disclosed, scanner disc 16 is of the configuration shown in Figure 5, i.e. four clear sections and three opaque sections each of 22½ degree duration and alternately spaced, with the remaining section opaque. Scanner disc 16 is rotated at 60 revolutions per second and owing to wedge spacing, effects a 480 cycle carrier frequency, accompanied by 420 cycle and 540 cycle side band frequencies.

Referring now to Figure 2, output from scanner disc 16 is sensed by photo-sensing device 20 represented by block 41. Photo-sensing device 41 produces electrical pulses whose phase is dependent upon the location of the image of source S with respect to scanner disc 16. These electrical pulses are conveyed to bandpass filter 42, this filter is tuned to 420 cycles, to 480 cycles and to 540 cycles and has a 15 cycle bandpass at these three frequencies; it has a 10,000 ohm characteristic impedance, a 0 db insertion loss, is capable of handling signals up to 100 volts peak to peak and has 120 db attenuation to 60 cycles. The mixing network used with this filter has 25 db loss. From bandpass filter 42, the filtered signal is conveyed to automatic gain control amplifier 43. From thence, the signal is conveyed to 60 cycle detector 44 and from thence to each of two identical control circuits $C_1$ and $C_2$. In each control circuit, there is included 60 cycles demodulator 45, integrating network 45, 400 cycle modulator 47 and amplifier 48. Output from control circuits $C_1$ and $C_2$ is conveyed to control lines $x$ and $x'$ and is mixed and conveyed to adder 49 where the two signals are summed. The resulting signal is conveyed to automatic gain control rectifier 50 and from thence to automatic cutoff circuit 51 which is connected between photo-sensing device 41 and bandpass filter 42. Automatic cutoff circuit 51 effectively causes tracking to cease when circuit signal-to-noise ratio becomes too low in value; the circuit connects to cutoff switch 111 (Figure 3).

*Detailed description of celestial detector circuits*

Figure 3:
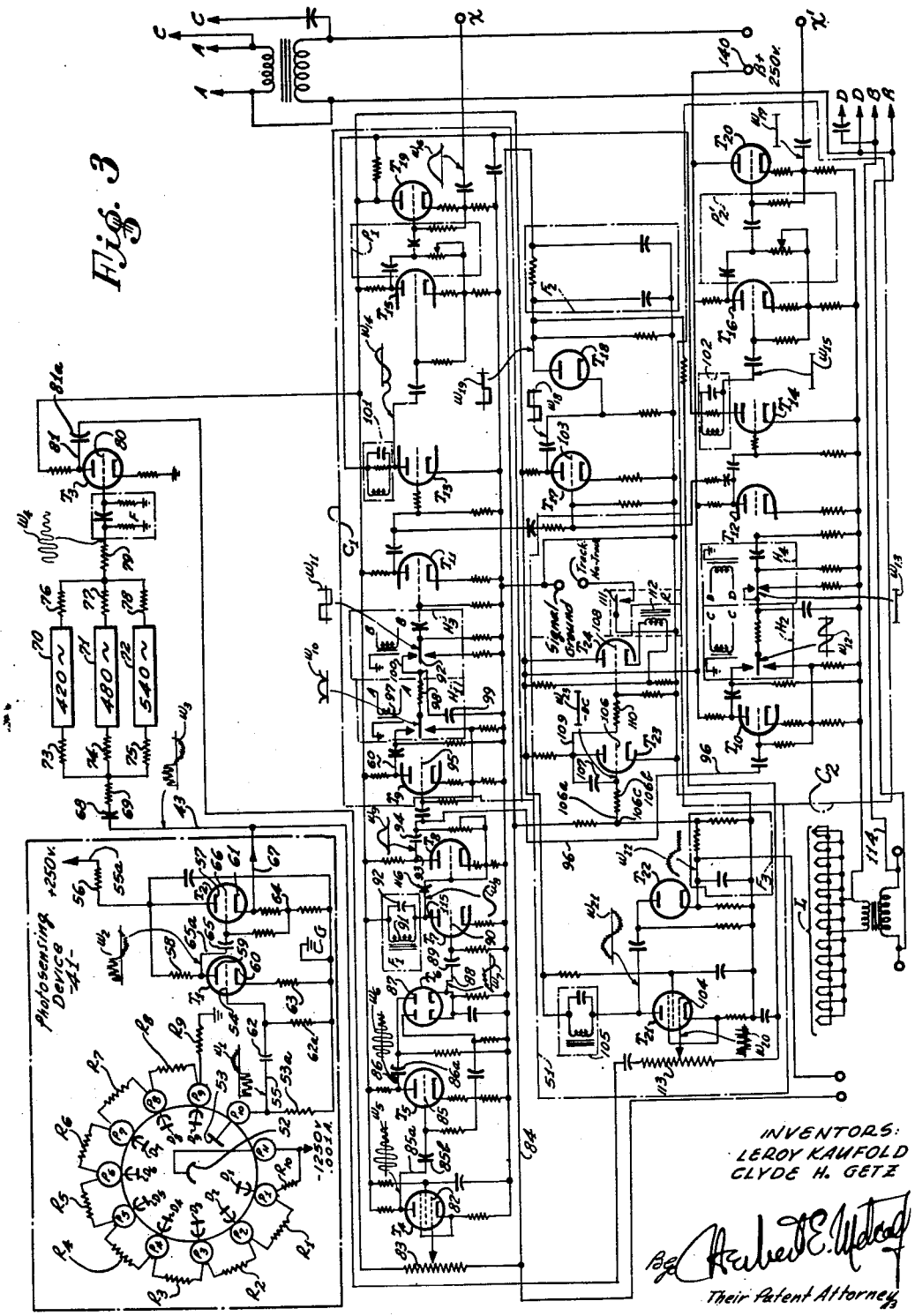
Figure 3 is a schematic diagram of a preferred embodiment of the invention.

Figure 3 is a schematic diagram of circuitry indicated previously in block diagram form in Figure 2. Photo-sensing device 41 is a 1P21 type photo-multiplier tube. The number of electrons released from cathode 52 is proportional to the number of incident photons (amount of light received) from telescope 1. Secondary emission multiplying or deflecting anode or dynodes, as they are sometimes called, $D_1$, $D_2$, $D_3$, $D_4$, $D_5$, $D_6$, $D_7$, $D_8$, and $D_9$ are connected by means of resistors $R_1$ through $R_8$ to potential points $P_1$ through $P_9$, respectively. Potential point $P_9$ is grounded via resistor $R_9$. Cathode 52, connected to dynode $D_1$ via resistor $R_{10}$, upon bombardment by photons emits electrons which strike first anode $D_1$, consequently liberating secondary electrons which, in turn, are directed to anode $D_2$. These electrons, in turn, generate more secondary electrons from anode $D_2$ and so on to anode $D_9$. Final or collector anode 53 is connected to grid 54 of electron tube $T_1$ via condenser 62.

Velocities of electrons leaving anode $D_9$ are in accordance with a Maxwellian distribution, i.e., a distribution such that the number of electrons at a given velocity is proportional to the reciprocal of the exponential of the square of the velocity. A portion of these electrons possess sufficient velocity to reach final anode 53; a resulting signal represented by waveform $W_1$ is conveyed to grid 54 of electron tube $T_1$ which serves as a preamplifier. This signal occurs on lead 55; it is represented by waveform $W_1$; phase of this signal $W_1$ is dependent upon image location on scanner disc 16. A +250 volt potential is applied via lead 55a and D.C. coupling resistor 56 to plate 57 of electron tube $T_2$, and via plate resistor 58 to plate 59 of electron tube $T_1$. Cathodes 60 and 61 of electron tubes $T_1$ and $T_2$, respectively, are grounded via resistors 63 and 64, respectively. Grid input resistor 53a is also connected to ground G. The condenser 62-resistor 62a combination differentiates a signal $W_1$ into grid 54. An amplified signal (by a factor of 25, for example) from electron tube $T_1$, represented by waveform $W_2$, is conveyed via lead 65a and input condenser 65 to grid 66 of electron tube $T_2$ which serves as a conventional cathode follower; the output waveform $W_3$ from tube $T_2$ is conveyed via leads 67 and 43 to isolation capacitor 68 and isolation resistor 69, to a 420 cycle filter 70, a 480 cycle filter 71, and a 540 cycle filter 72 via isolation resistors 73, 74, and 75, respectively. Filters 70, 71 and 72 are conventional, m-derived bandpass filters each having approximately a 15 cycle bandpass.

Modulated signals $W_4$ from bandpass filters 70, 71 and 72 are conveyed through mixing resistors 76, 77, and 78 and then through mixing resistor 79 and filter input F, which shapes the envelope of signals $W_4$, to the grid 80 of electron tube $T_3$ where the resulting signals are amplified. Lead 81 then conveys the amplified signal via coupling condenser 81a to grid 82 of electron tube $T_4$ which is a remote cutoff pentode having a signal automatic volume control applied to its grid 82 via resistor 83, which can be set at a predetermined value, and lead 84; the purpose of this automatic volume control signal is to increase dynamic range of the circuit, i.e. to track relatively bright light sources without overloading subsequent stages. Plate output from tube $T_4$, represented by waveform $W_5$ is conveyed via lead 85a and condenser 85b to grid 85 of electron tube $T_5$, which is used as a unity gain phase inverter. Plate output from electron tube $T_5$, represented by waveform $W_6$ is conveyed via lead 86 and condenser 86a to plate 87 of electron tube $T_6$ which is utilized as a full wave detector. Cathode output represented by sixty cycle waveform $W_7$ from electron tube $T_6$ is conveyed via lead 88 and condenser 89 to grid 90 of electron tube $T_7$ which is an amplifier stage whose plate output represented by waveform $W_8$ is conveyed to 60 cycle filter $F_1$, comprising inductor 91 and capacitor 92. Electron tube $T_8$ is used as a unity gain phase inverter which receives a substantially sixty cycle input $W_8$ from tube $T_7$ via lead 115 and condenser 116 and whose output (waveform $W_9$) is conveyed via lead 93, capacitor 94 to grid 95 of phase shifter tube $T_9$ which enables positioning the phase of the signal $W_9$ to correspond with the alignment of the telescopes in the gimbals. Output waveform $W_9$ from electron tube $T_8$ is conveyed via leads 93 and 96 to electron tubes $T_9$ and $T_{10}$, respectively. It is to be noted that these tubes ($T_9$ and $T_{10}$) provide input to identical control circuits $C_1$ and $C_2$, respectively. Only control circuit $C_1$ will be explained in detail since control circuit $C_2$ operates in an analogous manner. Chopper relay coil 97 of sixty cycle demodulator chopper $H_1$ when energized by a signal from connections AA completes the circuit and conveys waveform $W_{10}$ to an RC network combination of resistor 98 and condenser 99, which has a time constant of 3 seconds; this time delay tends to further narrow the bandwith of signal $W_{10}$ and further reduces noise that is present. The signal represented by $W_{10}$ is then conveyed via lead 100 to 400 cycle modulator chopper $H_3$. Electron tube $T_{11}$ is an amplifier for the small signals $W_{10}$ from chopper $H_3$. It is to be noted that no output is shown for chopper $H_4$ (control circuit $C_2$). This situation would occur when a celestial object is being tracked along an axis of scanner disc 16 in one direction only; the signal $W_{12}$ from chopper $H_2$ is 90° out of phase with the signal $W_{10}$ from chopper $H_1$ owing to action of phase shifter tube $T_{10}$. Electron tubes $T_{13}$ and $T_{14}$ serve as limiters for supplementing the automatic volume controlled action of electron tube $T_4$ in order to maintain constant output to the resolvers (not shown). The purpose of low Q tuned plate circuit 101 is to smooth out square waves $W_{11}$ produced by the chopper $H_3$; similarly low Q tuned plate circuit 102 smooths out any square waves $W_{13}$ produced by chopper $H_4$. The resulting 400 cycle signal from plate of electron tube $T_{13}$ is represented by waveform $W_{14}$. Plate of tube $T_{14}$ has D.C. level represented by waveform $W_{15}$. Tube $T_{15}$ as tube $T_{16}$ serves as a unity gain amplifier. Phase shift circuit $P_1$ in the output of tube $T_{15}$ as phase shift circuit $P_2$ in the output of tube $T_{16}$ serves to shift the phase of a signal to the resolvers (not shown). Electron tube $T_{19}$ as tube $T_{20}$ serves as a cathode follower to afford low impedance outputs (waveforms $W_{16}$ and $W_{17}$, respectively) to the resolvers (not shown). The outputs from electron tubes $T_{11}$ and $T_{12}$ (no output in the example shown) are mixed in grid 103 of electron tube $T_{17}$, consequently producing an automatic volume control signal $W_{19}$ by rectifying the signal $W_{18}$ appearing on plate of tube $T_{17}$ in tube $T_{18}$ which, with proper filtering by means of filter $F_2$, is used as automatic volume control signal on grid 82 of electron tube $T_4$, being applied via lead 84 and preset resistor 83. It is to be noted that with signals at the input grid 82 of tube $T_4$ of from .20 to 9.0 volts peak-to-peak amplitude, any output signals from tubes $T_{19}$ and $T_{20}$ as $W_{16}$ and $W_{17}$, respectively, are maintained relatively constant (within an accuracy of $\pm 10\%$).

Automatic cutoff circuit 51 is a "track-no-track" circuit comprising electron tubes $T_{21}$, $T_{22}$, $T_{23}$, and $T_{24}$. A portion of the output waveform $W_3$ of the pre-amplifier (electron tube $T_1$ and $T_2$ combination) is conveyed via grid 104 of tube $T_{21}$ which is a remote cutoff pentode having automatic volume control applied from the same source that supplies tube $T_4$ (output waveform $W_{19}$ from tube $T_{18}$). Resulting noise signal $W_{20}$ is amplified in electron tube $T_{21}$ whose plate circuit is tuned to 10 kilocycles (so none of the signal frequency is misinterpreted as noise) by means of tuned circuit 105; consequently noise content of signal $W_{20}$ is sensed. The 10 kilocycle noise signal $W_{21}$ from tube $T_{21}$ is rectified by means of diode $T_{22}$ yielding signal $W_{22}$ which is filtered by filter circuit $F_3$; then the filtered signal is applied via lead 106a and resistor 106b to grid 106 of electron tube $T_{23}$ which is the "track-no-track" relay control tube. Electron tube $T_{23}$ is an amplifier which effects integration by using feedback from the plate circuit to the grid circuit via condenser 107. Upon application of a signal $W_{22}$ to point 106c, a negative automatic volume control signal $W_{23}$ is developed at the grid 106 of tube $T_{23}$; the effect of this negative signal $W_{23}$ is to cut off tube $T_{23}$ whose resulting high plate voltage is applied to grid 108 of tube $T_{24}$ via lead 109 and resistor 110, causing tube $T_{24}$ to conduct; as a result of this conduction, switch 111 of track-no-track relay R is closed owing to consequent energization of relay coil 112. The status of switch 111 is controlled by the ten kilocycle noise level. Gain of tube $T_{21}$ is adjusted by means of resistor 113 so that when the applied signal is less than three times the noise, "track-no-track" relay switch 111 will open, thus disconnecting the tracking circuit. Integrating amplifier tube $T_{23}$ maintains relay switch 111 closed for 45 to 90 seconds, after the signal has been removed from the stellar detectors. The purpose of this time delay is to account for temporary loss of light signal if the image is bounding in and out of the exact center of telescope 1. Output signals from control circuits $C_1$ and $C_2$ are taken from terminals x and x', respectively.

It is to be noted that in a nighttime navigational system, noise is not a very large factor except in the case when the navigational star being tracked is extremely close to a full moon.

In a preferred embodiment of the invention, a B+ supply of 250 volts at .160 amperes is applied leads 55a and 140.

Excitation means for sixty cycle demodulator chopper $H_1$ and for sixty cycle demodulator chopper $H_2$ is provided from the same sixty cycle source, e.g. rotor 14 which drives scanner 16 (Figure 1).

The filaments L and four hundred cycle choppers $H_3$ and $H_4$ utilize power from four hundred cycle main line 114 via connections AA, BB, CC, and DD as shown in Figure 3.

It is to be further noted that "up-down" and "rightleft" signals can be obtained by shifting 90° the excitation signals which are applied to choppers H₂ and H₄.

An expression has been derived for determining voltage amplitude at any harmonic of the fundamental frequency:

$$f = \frac{\sin\frac{n\theta}{2}}{n}\sqrt{\left[1 + \frac{\cos\left(\frac{p+1}{2}n\alpha\right)\sin\left(\frac{p}{2}n\alpha\right)}{\sin\left(\frac{n\alpha}{2}\right)}\right]^2 + \left[\frac{\sin\left(\frac{p+1}{2}n\alpha\right)\sin\left(\frac{p}{2n\alpha}\right)}{\sin\left(\frac{n\alpha}{2}\right)}\right]^2}$$

Alternate embodiment

Figure 4:
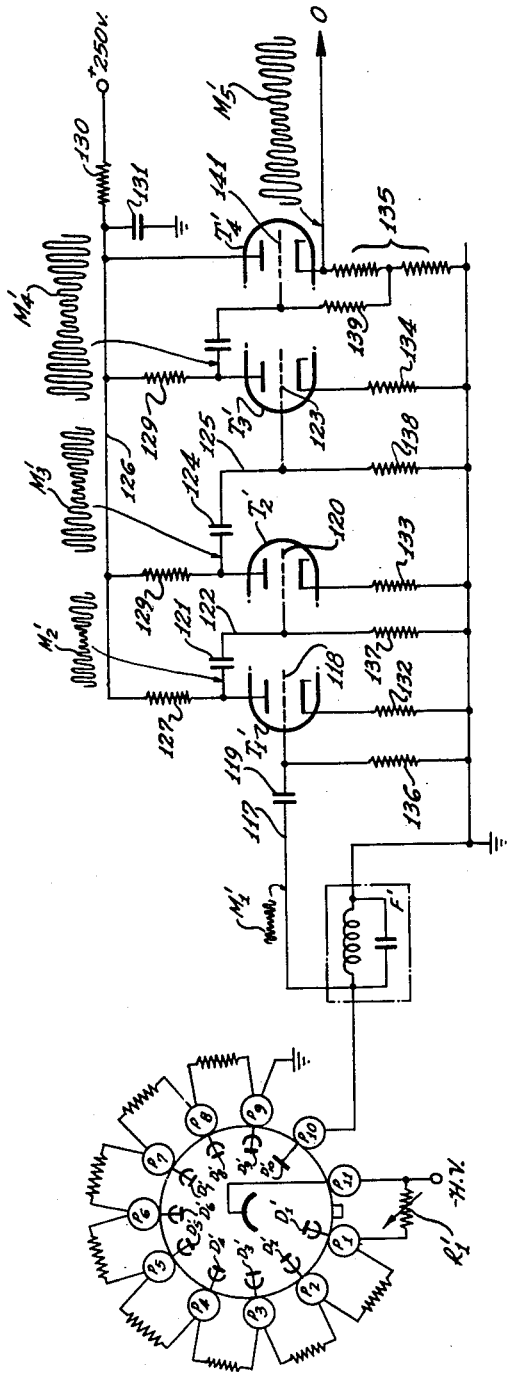
Figure 4 is a schematic diagram of an alternate embodiment of the invention—a circuit designed to filter a spurious frequency component and consequently to increase the dynamic range of a photo-sensing device.

Figure 4 comprises a schematic diagram of an alternate embodiment of the photoelectric circuit utilized in the invention. Essentially, this circuit comprises a photomultiplier type tube with a tuned load circuit to which a preamplifier is connected; high pass coupling networks are included in this amplifier. The purpose of this circuit is to increase signal pulses-to-sixty cycle background ratio in first amplifier stages and also to prevent overloading by a sixty cycle signal.

The photo-sensing device—a 1P21 type photo-multiplier tube, for example, has already been explained in conjunction with Figure 3. It is to be noted, however, that resistor $R_1'$, corresponding to resistor $R_1$ of Figure 3, is shown to be variable. The reason for using adjustable resistor $R_1'$ is to maintain voltage on first dynode $D_1'$ at optimum collection value—as required for daytime stellar tracking operations, for example.

A modulated waveform and envelope, represented by $M_1'$, appears on lead 117 during the process of tracking a light source S, for example. Filter circuit F' is tuned to the fundamental frequency—480 cycles, for example, of modulated signal $M_1'$. The filtered signal is applied to grid 118 of electron tube amplifier $T_1'$ via coupling condenser 119. A resulting amplified signal $M_2'$ is applied to grid 120 of electron tube $T_2'$ via coupling condenser 121 and lead 122; electron tube $T_2'$ serves as a low impedance coupling network component. Amplified signal $M_3'$ appears on the plate output of tube $T_2'$ from whence it travels to grid 123 of electron tube $T_3'$ via coupling condenser 124 and lead 125. Still further amplified signal $M_4'$ consequently appears on the plate of electron tube $T_3'$ and then travels to grid 141 of electron tube $T_4'$ which serves as a cathode follower from which output O (waveform $M_5'$) is taken to band pass filter 43, as shown previously in Figures 2 and 3.

The plates of electron tubes $T_1'$, $T_2'$ and $T_3'$ are connected to common B+ line 126 via plate resistors 127, 128 and 129, respectively; the plate of electron tube $T_4'$ is also connected to common B+ lead 126 which is connected to a source of +250 volts via decoupling resistor 130 and by pass condenser 131. The cathodes of electron tubes $T_1'$ through $T_4'$ are grounded via cathode resistors 132 through 135, respectively. Grid resistors 136 through 139 provide return-to-ground for grids 118, 120, 123 and 141, respectively.

Description of scanner

Figure 5a is a frequency distribution graph for a particular configuration of scanner disc 16. A preferred configuration, as utilized in conjunction with circuits previously described, is represented by Figure 5, the shaded areas representing opaque sectors, the four unshaded sectors representing light-transmissive sectors.

Referring now to Figure 5a the frequency in cycles per second is used as abscissas and output in volts is used as ordinates; frequency is plotted on a logarithmic scale. Study of this graph will reveal that the 60 cycle rotational frequency, the 480 cycle fundamental frequency, and its two accompanying side bands—420 cycles and 540 cycles predominate in the spectrum. Furthermore, the amplitude of the 480 cycle fundamental is almost equal in magnitude to the amplitude of the 60 cycle sky gradient. It is very desirable to provide a large output with but small 60 cycle sky gradient. The other frequencies shown represent harmonics of the fundamental frequency.

Where:
$n \equiv$ the number of the harmonic
$\theta \equiv$ angular width of light transmissive sectors
$\alpha \equiv$ distance between center of clear sectors
$p \equiv$ number of clear sectors.

Results of a harmonic content test revealed calculated values to be somewhat less in magnitude than experimental values; this deviation in values can be attributed to stray 60 cycle pickup in the leads from the phototube to the harmonic wave analyzer and in the phototube wiring.

It is apparent to one skilled in the art that many changes could be made in the previously described construction and that many apparently widely different embodiments of this invention could be derived without departure from the scope thereof; consequently, it is intended that all matter embodied in the foregoing description or shown in the accompanying drawings is presented for purposes of illustration only and is not intended to limit this invention as established within the legitimate and valid scope of the appended claims.

What is claimed is:

1. A finite light source detector system comprising a scanner disc, a power source for rotating said scanner disc, means for focusing a finite light image onto said scanner disc, a photo-sensing device, a band pass filter connected to said photo-sensing device, an automatic gain control amplifier connected to said band pass filter, a first frequency detector connected to said automatic gain control amplifier, a connection from said first frequency detector to each of two identical control circuits each of which include a first frequency demodulator, a delay circuit connected to said first frequency demodulator, a second frequency modulator connected to said delay circuit, an amplifier connected to said second frequency modulator, an output from said amplifier, a connection from each of said two identical control circuits from said amplifier to an adder circuit, an automatic gain control rectifier connected to said adder circuit, an automatic cutoff circuit, connected to said automatic gain control rectifier, a connection from said automatic cutoff circuit to a contact between said photo-sensing device and said band pass filter.

2. Apparatus in accordance with claim 1 in which said band pass filter is an m-derived 420 cycle, 480 cycle, 540 cycle combination filter.

3. Apparatus in accordance with claim 1 in which said photo-sensing device is a photo-multiplier tube.

4. Apparatus in accordance with claim 1 including means for conveying output signals from said output of each said identical control circuit to an altitude setting motor and to an azimuth setting motor, respectively which are used to control the positioning of a tracking telescope.

5. A celestial body detector circuit comprising a fan type scanner, modulated light signals being produced by said fan type scanner, a photo-multiplier-type tube arranged to intercept said modulated light signals, a connection from the plate of said photo-multiplier type tube to a first amplifier-cathode follower combination, a band pass filter connected to said amplifier-cathode follower combination, an automatic gain control amplifier tube with its grid connected to an output from said band pass filter, a first phase inverter connected to output from said automatic gain control amplifier tube, a full-wave detector connected to said phase inverter, a filter circuit connected to the output from said full wave detector, a second amplifier connected to said filter circuit, a second phase inverter connected to output from said second amplifier, a second phase shifter connected to output from said second phase inverter tube, said output being connected to a first control circuit and to a second control circuit, said first control circuit being identical with said second control circuit and including a third phase inverter, a first chopper connected to said third phase inverter, an integrating network connected to said first chopper, a second chopper connected to said integrating network, a third amplifier connected to output from said second chopper, a limiter connected to said third amplifier, a common connection from the limited output of said first control circuit and of said second control circuit to the grid of a mixer tube, a rectifier connected to the output from said mixer tube, an automatic cutoff circuit connected to the output from said rectifier whereby tracking of a celestial body is controlled in accordance with the magnitude of circuit signal-to-noise ratio.

6. Apparatus in accordance with claim 5 in which said second amplifier has a selective circuit connected to its plate circuit, said selective circuit being tuned to the same frequency as said filter circuit.

7. Apparatus in accordance with claim 5 including output means for said first control circuit and for second control circuit, said output means being conveyed to telescope altitude control and to telescope azimuth control respectively.

8. In a finite light source detector system, a circuit for increasing the dynamic range of a photo-sensing device, said circuit comprising a photo-sensing device, a frequency selective circuit connected across the output of said photo-sensing device as a discriminating load whereby signal pulse to background noise ratio is increased.

9. Apparatus in accordance with claim 8 in which said photo-sensing device is a 1P21 type photo-multiplier tube.

10. A finite light source detector system comprising a scanner disc, means for rotating said scanner disc at a reference frequency, means for focusing a finite light image onto said scanner disc, a photo-sensing device positioned behind said scanner disc, filter means connected to said photo-sensing device for passing a harmonic signal and accompanying upper and lower side bands thereof, a full wave detector connected to said filter means for detecting the output signal envelope therefrom, and phase shifting means connected to said full wave detector for shifting said envelope 90 degrees whereby said envelope signals provide suitable azimuth and elevation control signals for orienting said light focusing means.

11. Apparatus in accordance with claim 10 including, in addition, an automatic gain control amplifier connecting said filter means and said full wave detector for providing a constant amplitude signal to said full wave detector.

12. A scanning device comprising a disc having a plurality of alternately spaced transparent and opaque sectors in which at least one of said opaque sectors is greater than 180 degrees in width.

13. Apparatus in accordance with claim 12 wherein said sectors are of equal width except for said one opaque sector greater than 180 degrees.

No references cited.